J. SCHLUDA.
CONVERTIBLE WAGON AND SLED.
APPLICATION FILED OCT. 26, 1915.

1,184,777. Patented May 30, 1916.

Witness
Harold Forsberg

Inventor
John Schluda
By John A. Bommhardt
Atty

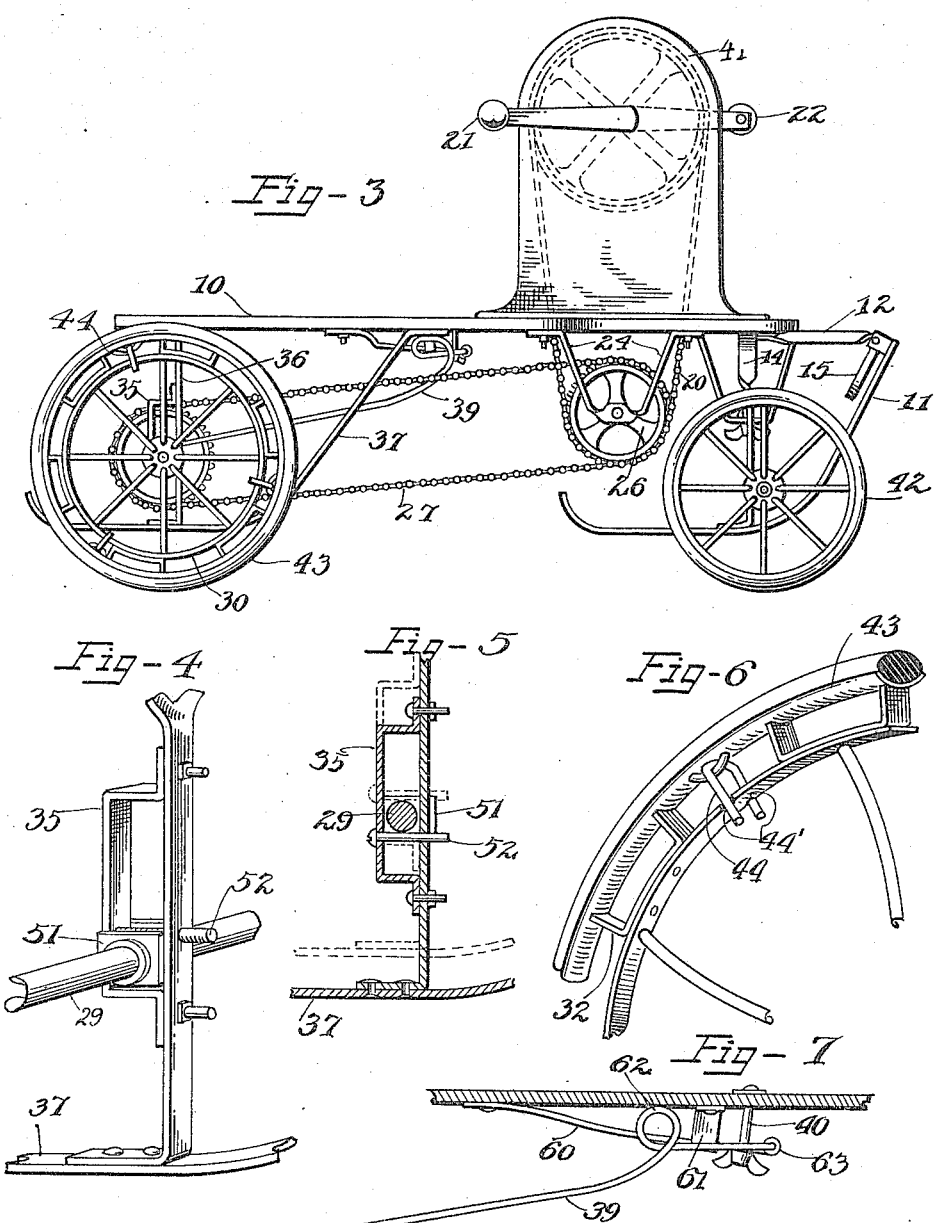

UNITED STATES PATENT OFFICE.

JOHN SCHLUDA, OF CLEVELAND, OHIO, ASSIGNOR OF ONE-HALF TO MICHAEL J. MARUNA, OF CLEVELAND, OHIO.

CONVERTIBLE WAGON AND SLED.

1,184,777.   Specification of Letters Patent.   Patented May 30, 1916.

Application filed October 26, 1915. Serial No. 57,910.

*To all whom it may concern:*

Be it known that I, JOHN SCHLUDA, a subject of the Emperor of Austria-Hungary, residing at Cleveland, in the county of Cuyahoga and State of Ohio, have invented certain new and useful Improvements in Convertible Wagons and Sleds, of which the following is a specification.

This invention relates to convertible wagons and sleds, and has for its object to provide an improved vehicle, suitable especially for the use of children, which can be changed from a wagon to a sled when desired. The vehicle is provided with hand driving devices which are operated under either condition of use, the rear wheels being changeable from running wheels to traction wheels, and acting to drive the vehicle when used as a sled.

Figure 1:
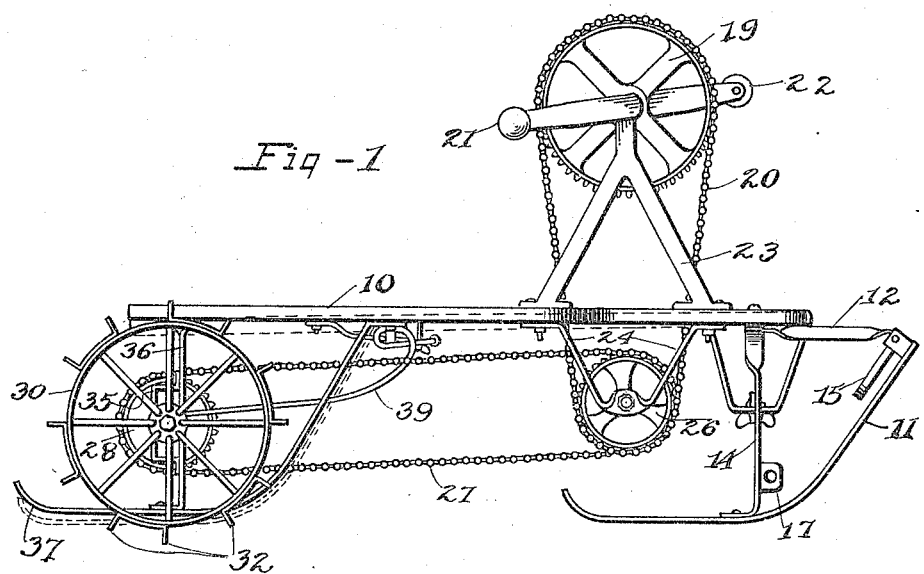
Figure 2:
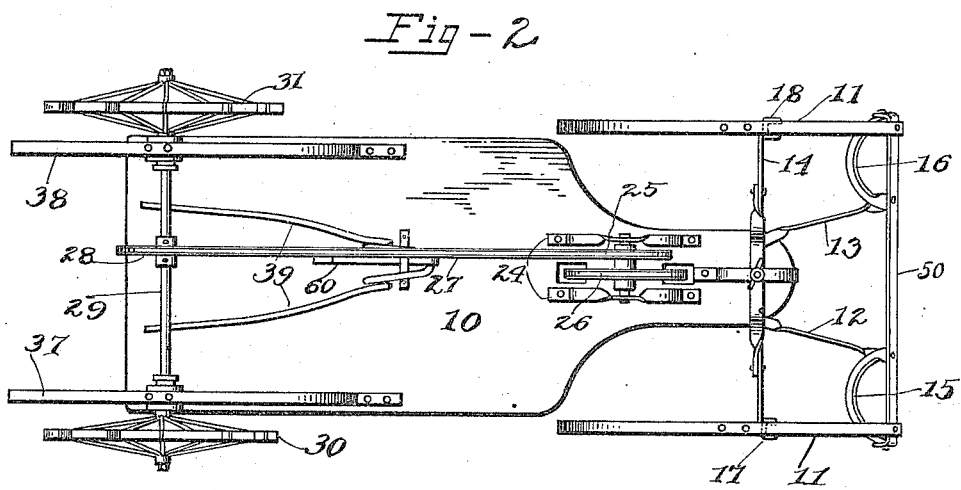

The invention is illustrated in the accompanying drawings, in which,

Figure 1 is a side elevation of the vehicle arranged as a sled. Fig. 2 is a bottom plan thereof. Fig. 3 is a side elevation showing the device arranged as a wagon. Fig. 4 is a detail in perspective of the rear axle connections. Fig. 5 is a section of the parts shown in Fig. 4 in a different position. Fig. 6 is a detail of the removable wheel rim. Fig. 7 is a detail of the rear spring connection.

Referring specifically to the drawings, 10 is a platform to which is connected front runners 11 by means of a frame comprising a U-bar 14 and braces 12 and 13, the latter being connected to a front cross bar 50, extending between the front ends of the runners. This cross bar supports foot rests 15 and 16 used for steering the vehicle.

17 and 18 are lugs projecting from the frame 14, and these lugs have holes to receive the front axle when the front wheels 42 are used, as shown in Fig. 3. When the wheels and axle are removed the runners rest on the ground, and when the wheels are used the runners are raised from the surface.

A driving sprocket 19, provided with hand cranks 21 and 22, is supported by standards 23 on the platform, and is connected by a chain 20 to a sprocket 26 the shaft of which is supported by brackets 24 on the under side of the platform, and said shaft carries a sprocket 25 connected by the chain 27 to a sprocket 28 on the rear axle 29. The driving gear on the platform may be covered by housing 41.

The rear wheels 30 and 31 are mounted on the rear axle. These wheels are changeable from running to traction wheels. Each wheel has projected lugs or spurs 32 on outer rim thereof to engage snow or ice when the device is used as a sled. These spurs receive and support an outer rim 43 when desired, this rim serving to convert the wheel into a running wheel. The rim is sprung onto the spurs, and fastened by U-bolt connections 44, which engage notches 44' in the rim of wheel 30.

The rear runners 37 and 38 are fastened at their front ends to the platform, and their rear ends are connected to the platform by standards 36. Each standard has a boxing 35 secured thereto, and inclosing a bearing block 51 through which the rear axle 29 passes. The blocks are adjustable in the boxings to raise or lower the platform and runners with respect to the axle, and held in adjustment by a pin 52, shown in Fig. 5. The block may be placed either above or below the pin. When the device is used as a wagon the platform is preferably raised, and the blocks placed below the pins, so that the runners are held out of contact with the ground. When used as a sled, the blocks are placed above the pins, thereby lowering the platform so that the runners rest on the ground or surface, with the spurs of the traction wheel projecting below the same to engage snow or ice, and in this adjustment the body may be supported with respect to the rear axle by means of spring 39, the rear ends of which bear upon the axle, and the front ends of which are secured to the under side of the platform by a flat spring bar 60 which is guided by bracket 61. A bolt 40 provided with an adjustable nut to vary the tension of the springs, secures spring end of 60 to platform. The springs are conveniently made of one piece of metal braced by loop at 62 to platform and bent to pass through loop of bar 60 at 63. By this arrangement the platform is supported by the spring, and the bearing blocks 51 may move up and down to the extent permitted by the boxings 35 and the pins 52.

By the means described, the change from a wagon to a sled may be easily made, and in either case the driving apparatus will act to propel the same. Steering may also be effected under either condition.

What I claim is:

1. A vehicle provided with front and rear runners, and with front and rear wheels, the front wheels being removable, and the rear wheels being vertically adjustable and having traction spurs and removable rims to convert said wheels from running to traction wheels.

2. A vehicle having front and rear runners, and front and rear wheels, the front wheels being removable, and the rear wheels having removable rims and traction spurs which are normally covered by said rims and which are exposed when said rims are removed.

3. A vehicle having a rear axle and wheels, and means to drive the same, rear runners beside the wheels, and means to raise and lower the axle with respect to the runners, said wheels having removable rims, and traction devices which are exposed when the rims are removed.

4. A convertible wagon and sled, having a rear axle and wheels, and means to drive the same, runners beside the wheels, the axle being vertically movable with respect to the runners, and springs between the axle and the platform of the wagon.

In testimony whereof I affix my signature in presence of two witnesses.

JOHN SCHLUDA.

Witnesses:
JOHN A. BOMMHARDT,
M. J. MARUNA.

Copies of this patent may be obtained for five cents each, by addressing the "Commissioner of Patents, Washington, D. C."